(12) United States Patent
Ikegami

(10) Patent No.: US 12,386,336 B2
(45) Date of Patent: Aug. 12, 2025

(54) SERVO CONTROL APPARATUS AND SERVO CONTROL METHOD

(71) Applicant: OKUMA Corporation, Aichi (JP)

(72) Inventor: Riku Ikegami, Aichi (JP)

(73) Assignee: OKUMA CORPORATION, Niwa-Gun (JP)

( * ) Notice: Subject to any disclaimer, the term of this patent is extended or adjusted under 35 U.S.C. 154(b) by 0 days.

(21) Appl. No.: 18/298,140

(22) Filed: Apr. 10, 2023

(65) Prior Publication Data

US 2023/0324884 A1 Oct. 12, 2023

(30) Foreign Application Priority Data

Apr. 11, 2022 (JP) ................. 2022-065296

(51) Int. Cl.
*G05B 19/414* (2006.01)
*G05B 19/404* (2006.01)
*G05B 19/4093* (2006.01)

(52) U.S. Cl.
CPC ....... *G05B 19/4142* (2013.01); *G05B 19/404* (2013.01); *G05B 19/4093* (2013.01); *G05B 2219/34013* (2013.01)

(58) Field of Classification Search
CPC .............. G05B 19/4142; G05B 19/404; G05B 19/4093; G05B 2219/34013
USPC ....................................... 318/486, 685, 560
See application file for complete search history.

(56) References Cited

U.S. PATENT DOCUMENTS

2018/0224830 A1* 8/2018 Iijima ................. G05B 19/416
2019/0354072 A1 11/2019 Ogawa et al.

FOREIGN PATENT DOCUMENTS

| JP | 2006227793 A | 8/2006 |
| JP | 2009282608 A | 12/2009 |
| JP | 2018128734 A | 8/2018 |
| JP | 2019204178 A | 11/2019 |

OTHER PUBLICATIONS

Komiya et al. (JP 4396541 B2) Control Parameter Sensitivity Analysis Device for Motor Control Device and Control Parameter Setting Method for Motor Control Device Date Published Jan. 13, 2010 (Year: 2010).*
Yasui et al. (JP H0772933 A) Method and Device for Positioning Control Date Published Mar. 17, 1995 (Year: 1995).*
JPO Notice of Reasons for Refusal for corresponding JP Application No. 2022-065296; issued Jul. 1, 2025.

* cited by examiner

*Primary Examiner* — Jorge L Carrasquillo
(74) *Attorney, Agent, or Firm* — CANTOR COLBURN LLP

(57) ABSTRACT

A servo control apparatus includes an actual machine frequency characteristic measurer that calculates a frequency characteristic of an actual machine from a motor input signal and an output of a detector, and a parameter adjuster that finds a solution for a parameter of a controller, which sets a difference, between an open loop characteristic, calculated from a calculation result of the actual machine frequency characteristic measurer and a frequency characteristic of the controller, and an ideal open loop characteristic, to be less than or equal to a predefined reference, and that applies the obtained parameter to the controller.

3 Claims, 3 Drawing Sheets

SERVO CONTROL APPARATUS AND SERVO CONTROL METHOD

CROSS REFERENCE TO RELATED APPLICATION

The present invention claims priority under 35 U.S.C. § 119 to Japanese Application, 2022-65296, filed on Apr. 11, 2022, the entire contents of which being incorporated herein by reference.

TECHNICAL FIELD

The present disclosure relates to a servo control apparatus such as a machine tool, and to a servo control method.

BACKGROUND

In industrial servo systems including machine tools or the like, from the viewpoints of realization of high-speed and high-precision positioning operations, and reduction of efforts for adjusting control parameters, there have been increasing demands for automation of an adjustment process.

In particular, adjustment of a feedback controller widely in use in the industry, and in which a gain stabilization filter for realizing a wide bandwidth and a vibration suppression filter for cancelling a resonance characteristic affects not only machining quality, but also the stability of a control system. Thus, execution of the adjustment based on the frequency characteristics is demanded, as such a configuration allows active consideration of the resonance characteristic of an actual machine and the stability of the control system.

The frequency characteristic of the actual machine differs among machine stands due to machine stand variations such as assembly errors for each machine stand and size variations of components.

FIG. 3 is a diagram showing an overview of a machine tool as an example configuration having a feed axis mechanism which is driven from a motor through a ball screw or the like.

On a front surface of a structure 32 vertically extending on a base 31 fixed on a floor surface, a motor 33, a ball screw 34, a guide 35, and a spindle head 36 are placed. A torque generated by the motor 33 is converted by the ball screw 34 into a force which acts in a straight-line direction, thereby controlling movement of the spindle head 36 movably supported on the guide 35 in the left-and-right direction in the figure. With a similar mechanism, movement of the spindle 36 in the up-and-down direction of the figure is controlled. With this configuration, a tool attached on a tip of the spindle head 36 is moved. In addition, movement of a table 37 placed on the base 31 in a direction into and out of the page is controlled. With this configuration, a workpiece 38 attached on an upper surface of the table 37 is moved. Further, the tool attached to the spindle head 36 is rotated so that the workpiece is machined by the tool.

Moreover, a position detection value is detected by a position detector 39a (rotational angle detector) attached to the motor 33, by a position detector 39b (load position detector) attached to the structure 32 to enable direct detection of the position of the spindle head 36, or by both of these detectors. The torque generated by the motor 33 is controlled by a control device 310 including a feedback controller such that the position detection value coincides with a position command signal generated in the control device 310.

The frequency characteristic of the actual machine used for the adjustment of the feedback controller can be calculated, for example, by frequency-analyzing a torque command value generated for driving the motor 33, and detection values of the position detector 39a (rotational angle detector) and the position detector 39b (load position detector), and determining a difference in the frequency spectra of these values.

FIG. 4 is a diagram showing an example of the variation of the frequency characteristic of the actual machine due to a position of a load device driven by the motor such as the spindle head 36 and the table 37 shown in FIG. 3.

As an example configuration, a broken line shows the frequency characteristic of the actual machine measured at a position (point a) when the spindle head 36 of FIG. 3 is moved toward the side of the motor 33, and a solid line shows the frequency characteristic of the actual machine measured at a position (point b) at which the spindle head 36 is sufficiently distanced from the motor 33. Depending on the position of the load device such as the table and the spindle head, a variation is caused in the frequency characteristic of the actual machine even in the same machine stand, due to variation of a motor axis equivalent inertia of a particular portion of the ball screw 34.

When the control parameter is adjusted with respect to the frequency characteristic of the actual machine measured in a state in which the load device is at the point a, there is a possibility that, when the load device is operated at a position near the point b, the gain stabilization filter and the vibration suppression filter fail to effectively act, due to the characteristic variation, which may result in occurrence of unusual sound and vibration, and reduction of the control performance. Thus, in order to stably enable high-speed and high-precision positioning operations, adjustment in consideration of the variation in the characteristic is demanded.

JP2018-128734 A discloses a technique for automatically adjusting a gain of a control system. In JP2018-128734 A, an actual frequency characteristic of a machine is measured by a sine sweep method. An ideal frequency characteristic is obtained by successively changing a set of parameters of a physical model such that a frequency characteristic calculated using the physical model coincides with the actual frequency characteristic. Further, in JP2018-128734 A, when there is a change or the like in a machining target of the machine or a jig/machine structure, the frequency characteristic of the actual machine is again measured and a difference from the ideal frequency characteristic determined previously is determined. The gain of the control system is then automatically adjusted so as to achieve a control performance similar to that before the change. With this configuration, reduction of the control performance due to the characteristic variation which occurs among the machine stands can be resolved.

In the technique of JP2018-128734 A, in order to obtain the ideal frequency characteristic, it is necessary to design the physical model in advance. Because of this, when a mass and an inertial system of the machine differ depending on the type of the machine, physical models corresponding to these types become necessary, resulting in a longer time period for implementation. In addition, when a large component of a machine resonance characteristic which affects the control performance is contained, because it is necessary to increase the inertia of the physical model, the technique may be affected by the restriction of calculation capabilities of a DSP (Digital Signal Processor). Further, even though the characteristic variation among the machine stands can be resolved, because only one physical model can be defined for each machine stand, it is difficult to handle the characteristic variation which occurs within the same machine stand.

SUMMARY

According to one aspect of the present disclosure, there is provided a servo control apparatus which drives a load device by a servo motor, the servo control apparatus comprising: a command generator that generates a command value of the servo motor; a detector that detects a state quantity of the servo motor or the load device to be driven; a controller that controls a motor input signal such that the command value and an output of the detector coincide with each other; an actual machine frequency characteristic measurer that calculates a frequency characteristic of an actual machine from the motor input signal and the output of the detector; and a parameter adjuster that finds a solution for a parameter of the controller which sets a difference, between an open loop characteristic, calculated from a calculation result of the actual machine frequency characteristic measurer and a frequency characteristic of the controller, and an ideal open loop characteristic, to be less than or equal to a predefined reference, and that applies the obtained parameter to the controller.

According to the servo control apparatus described above, there may be provided a controller which can be adjusted, when a characteristic variation occurs depending on the position of the load device, to enable stable high-speed and high-precision control, without causing the unusual sound and vibration and without reducing the control performance.

BRIEF DESCRIPTION OF DRAWINGS

Embodiment(s) of the present disclosure will be described based on the following figures, wherein.

DESCRIPTION OF EMBODIMENTS

Figure 1:
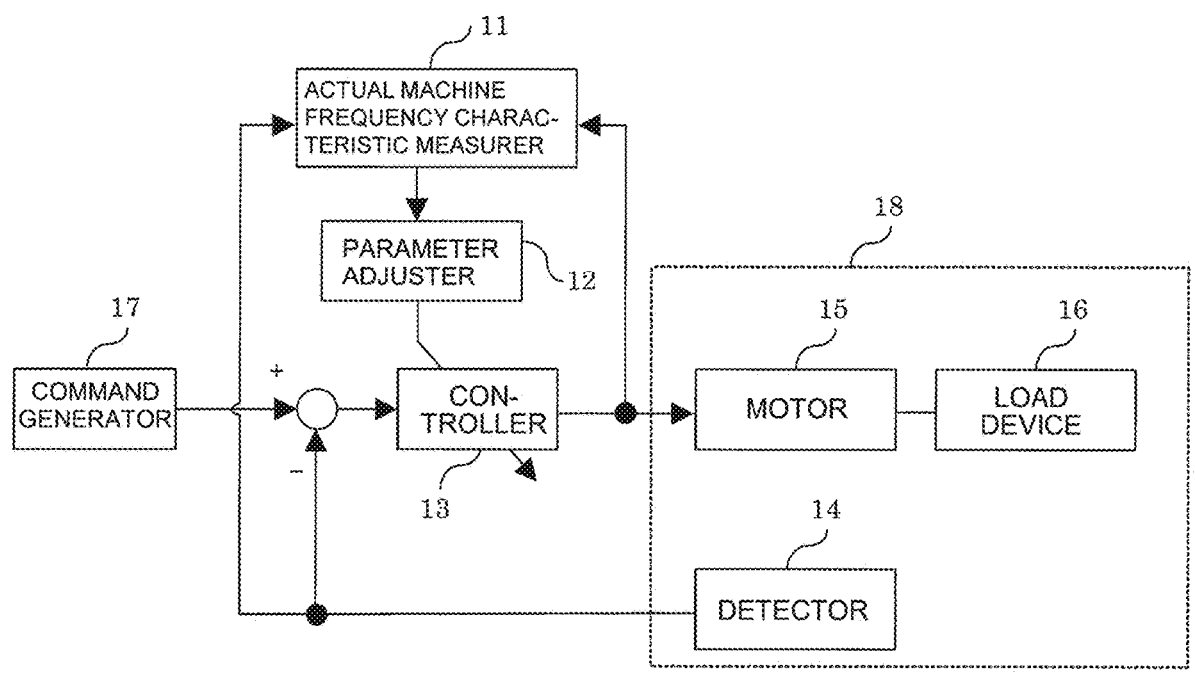
FIG. 1 is a block line diagram showing a structure of a servo control unit of a servo control apparatus.

FIG. 1 is a block line diagram showing a structure of a servo control unit of a servo control apparatus.

According to a program given from an operator or the like, a command generator 17 generates a movement command for a load device 16. A controller 13 controls a torque generated by a motor 15 so that the generated command and a value detected by a detector 14 coincide with each other. In addition, an actual machine frequency characteristic measurer 11 receives as inputs an output of the controller 13 and an output of the detector 14, calculates a frequency characteristic of a frequency characteristic measurement target part 18, and outputs the calculated frequency characteristic to a parameter adjuster 12. The parameter adjuster 12 finds a solution for an optimum parameter for the controller 13 based on the frequency characteristic calculated by the actual machine frequency characteristic measurer 11, and updates the controller 13. Each of the controller 13, the actual machine frequency characteristic measurer 11, and the parameter adjuster 12 is physically formed from a computer having one or more processors and a memory. The detector 14 detects a state quantity of the motor 15 or the load device 16, and is, for example, a position sensor, a vibration sensor, or the like.

Figure 2:
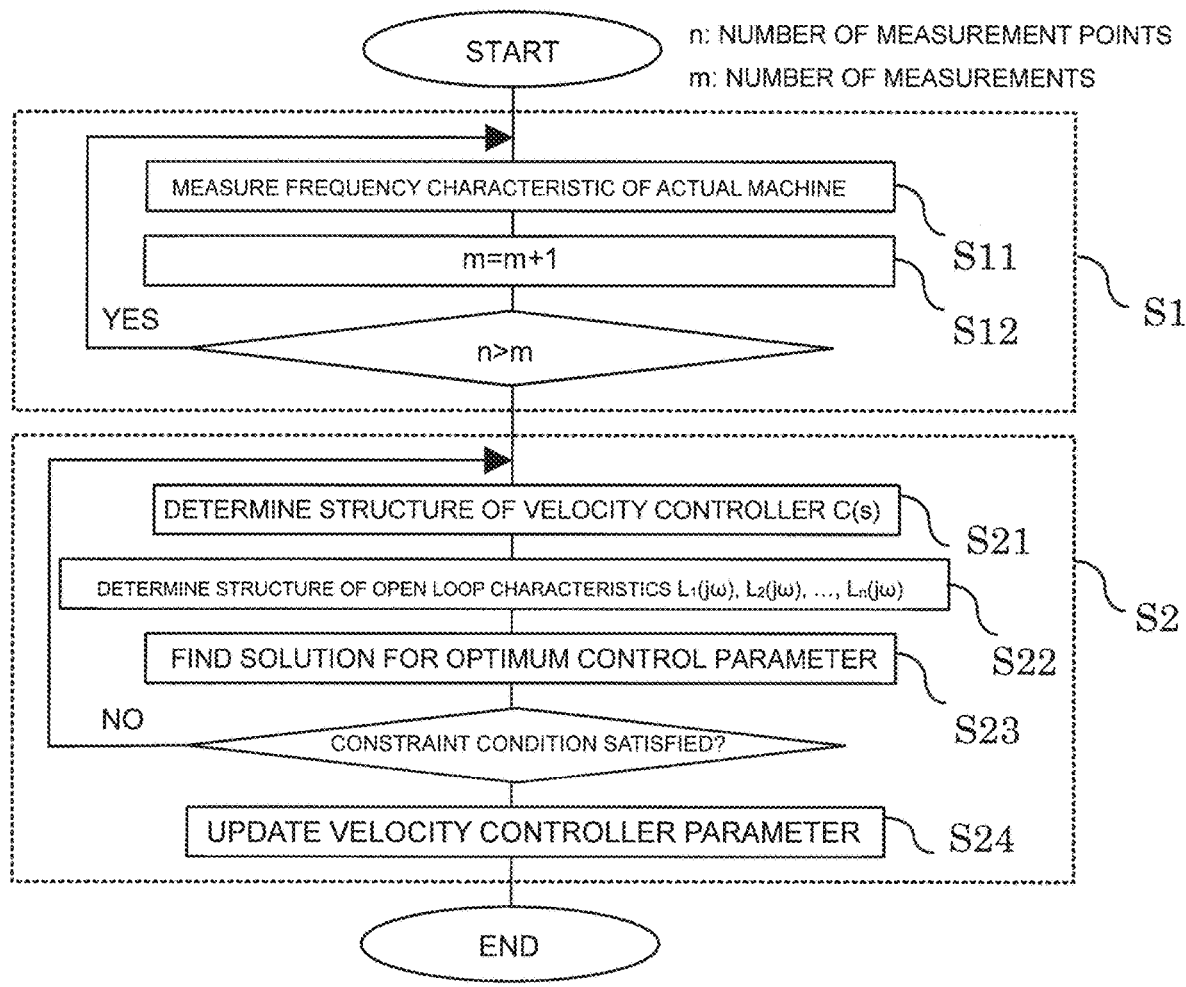
FIG. 2 is a flowchart showing an operation of a servo control apparatus.

FIG. 2 is a flowchart showing an operation of the servo control apparatus. S1 in FIG. 2 shows an operation of the actual machine frequency characteristic measurer 11 of FIG. 1, and S2 in FIG. 2 shows an operation of the parameter adjuster 12 of FIG. 1.

Figure 3:
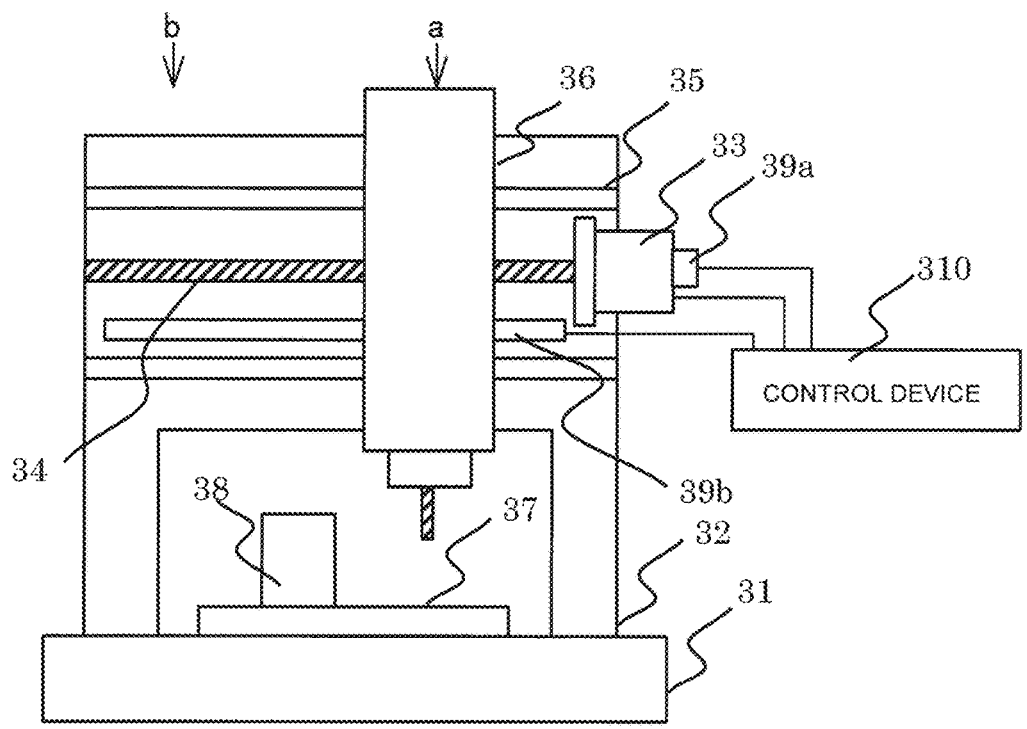
FIG. 3 is a diagram showing an example configuration of a typical machine tool.
Figure 4:
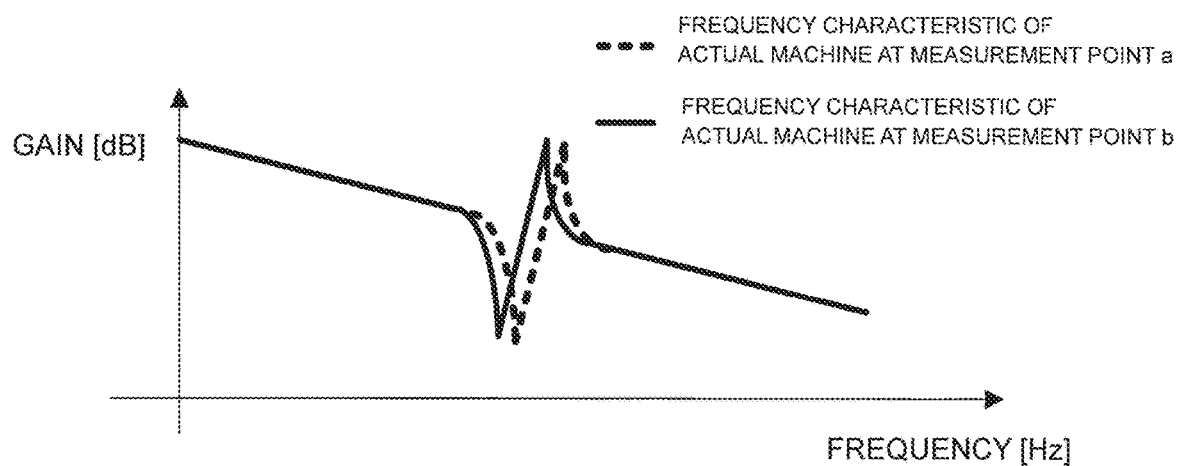
FIG. 4 is a diagram showing an example of variation of a frequency characteristic of an actual machine due to a position of a load device.

First, in step S11 and step S12, a frequency characteristic of an actual machine of the frequency characteristic measurement target part 18 shown in FIG. 1 is measured while changing a position of the load device. Here, a value n means a number of measurement points, and is a value determined in advance so as to maximize a variation width of the characteristic variation. For example, when the load device is the table 37 shown in FIG. 3, a difference in the motor axis equivalent inertia of the portion of the ball screw 34 is the maximum between a case in which the load device is positioned near a positive end in a movable range and a case in which the load device is positioned near a negative end. In addition, because an elastic deformation of the portion of the ball screw 34 is the maximum when the load device is positioned near a center of the movable range, desirably, 3 points are employed, including a point near the positive end, a point near the negative end, and a point near the center of the movable range. After the process of step S11, in step S12, a number of measurements m is incremented from 0, and, when the number of measurements m becomes greater than or equal to the number of measurement points n, the process proceeds to step S21.

In step S21, a structure of a velocity controller C(s) is determined based on the frequency characteristic of the actual machine obtained in steps S11 and S12. In the present example configuration, examples of elements of a compensator included in the structure of the velocity controller C(s) include, for example, a PID compensator, a PI compensator, a PD compensator, a P compensator, a phase advancement/delay compensator, a notch filter, an all-pass filter, a low-pass filter, and a high-pass filter. In the present embodiment, there is exemplified a structure which is described as the following formula (1) and in which a PI compensator and an X-stage notch filter $C_k(s)$ are combined. The notch filter $C_k(s)$ can be expressed as the following formula (2).

The number of stages X of the notch filter may be defined in advance in consideration of the calculation capabilities of the DSP and the number of resonance characteristics which usefully act on the widening of the bandwidth of the notch filter, or the like, and may alternatively be suitably changed in the step S21, in correspondence to the resonance characteristic of the frequency characteristic of the actual machine.

$$C(s) = \left(K_p + \frac{K_i}{s}\right) \cdot \prod_{k=1}^{K} C_k(s) \quad \text{formula (1)}$$

$$C_k(s) = \frac{s^2 + 2\alpha_k \zeta_k \omega_k s + \omega_k^2}{s^2 + 2\zeta_k \omega_k s + \omega_k^2} \quad \text{formula (2)}$$

In these formulae, $K_p$ and $K_i$ are parameters of the PI compensator, and $\alpha_k$, $\zeta_k$, and $\omega_k$ are parameters of the notch filter. In addition, s represents a Laplacian operator, and corresponds to a product of a unit imaginary number j and an angular frequency ω. Therefore, the controller C(s) may be expressed in a complex number, as shown below in formula (3).

$$C(j\omega) = \left(K_p + \frac{K_i}{j\omega}\right) \cdot \prod_{k=1}^{X} \left(\frac{(j\omega)^2 + 2\alpha_k \zeta_k \omega_k (j\omega) + \omega_k^2}{(j\omega)^2 + 2\zeta_k \omega_k (j\omega) + \omega_k^2}\right) \quad \text{formula (3)}$$

In step S22, open loop characteristics $L_1(j\omega)$, $L_2(j\omega)$, . . . , $L_n(j\omega)$ are designed based on the frequency characteristic of the actual machine measured in steps S11 and S12, and the controller C(s) designed in step S21.

When the frequency characteristics of the actual machine measured in steps S11 and S12 are $P_1(j\omega)$, $P_2(j\omega)$, . . . , $P_n(j\omega)$, the open loop characteristics $L_1(j\omega)$, $L_2(j\omega)$, . . . , $L_n(j\omega)$ in respective frequency characteristics of the actual machine may be represented by the following formula (4).

$$\begin{bmatrix} L_1(j\omega) \\ L_2(j\omega) \\ \vdots \\ L_n(j\omega) \end{bmatrix} = \quad \text{formula (4)}$$

$$\left(K_p + \frac{K_i}{j\omega}\right) \cdot \prod_{k=1}^{X} \left(\frac{(j\omega)^2 + 2\alpha_k \zeta_k \omega_k (j\omega) + \omega_k^2}{(j\omega)^2 + 2\zeta_k \omega_k (j\omega) + \omega_k^2}\right) \begin{bmatrix} P_1(j\omega) \\ P_2(j\omega) \\ \vdots \\ P_n(j\omega) \end{bmatrix}$$

With the complex-number expression using jω as in formula (4) rather than the transfer function expression using the Laplacian operator s, it becomes possible to determine the open loop characteristic without modeling the frequency characteristic of the actual machine.

Next, in step S23, a computation process is performed for an optimization problem for determining the parameters of the velocity controller C(s) based on the open loop characteristic of formula (4). In this process, as an optimization algorithm to be used, it is necessary to include a constraint condition using a gain margin and a phase margin, for the purpose of achieving an operation without an unusual sound and vibration. Thus, the optimization algorithm may be an algorithm for which a constraint formula may be provided. In addition, when the velocity controller C(s) is expressed in a linear form with respect to the solved parameter, formulation is possible by linear matrix inequality (LMI). In the present example configuration, because the open loop characteristic of formula (4) is expressed in a nonlinear form, a configuration will be described exemplifying the formulation of the optimization problem by sequential quadratic programming (SQP). After the formulation by the SQP, the following formula (5) may be obtained.

$$\min_{K_p, K_i, \alpha_k, \zeta_k, \omega_k} \sum_{q=1}^{n} \sum_{t=1}^{T} |L_d(j\omega_t) - L_q(j\omega_t)| \quad \text{formula (5)}$$

subject to:

$$-20\log_{10}|L_q(j\omega_p)| \geq GM \quad (q = 1, 2, \dots, n)$$

$$\tan^{-1}(L_q(j\omega_g)) - (-180°) \geq PM$$

Here, $L_d(s)$ represents an ideal open loop characteristic, and may be arbitrarily determined based on the performance demanded by the designer for the control system. When the widening of the bandwidth is simply targeted, for example, a form such as that shown below in formula (6) may be employed. Here, α and β are arbitrary coefficients. In addition, while the open loop characteristics using the frequency characteristic of the actual machine exist in a number corresponding to the number of measurement points n, there is only one ideal open loop characteristic $L_d(s)$.

$$L_d(s) = \alpha \frac{s + \beta}{s^2} \quad \text{formula (6)}$$

In formula (5) described above, $\omega_p$ represents an angular frequency when a phase characteristic becomes −180°, and the gain margin GM shows a gain characteristic of the open loop characteristic when the angular frequency becomes $\omega_p$. A parameter $\omega_g$ shows an angular frequency at which the gain characteristic becomes 0 dB, and the phase margin PM is a phase characteristic of the open loop characteristic when the angular frequency becomes $\omega_g$. A parameter T is a number of data points of the frequency characteristics used for the formulation of the optimization problem, and may be set to any arbitrary value within the number of data points measured in step S11.

The gain margin GM, the phase margin PM, and the ideal open loop characteristic $L_d(s)$ must be determined in advance, when formula (5) is formulated.

In formula (5), determination variables of the optimization problem for setting differences between the ideal open loop characteristic $L_d(s)$ and the open loop characteristics $L_1(j\omega)$, $L_2(j\omega)$, . . . , $L_n(j\omega)$ in the frequency characteristics of the actual machine to be less or equal to a predefined reference are $K_p$, $K_i$, $\alpha_k$, $\zeta_k$, $\omega_k$ (k=1, 2, . . . , X). When optimum solutions for these (2+3X) determination parameters can be obtained, the optimum open loop characteristic and the controller parameter can be determined.

In step S24, the velocity controller parameter is updated to the parameter solved in step S23, so that the load device 16 can be controlled with the optimum controller.

With this process, a controller which enables widening of the bandwidth is designed in all frequency characteristics when the load device is positioned at any arbitrary point, and in a state satisfying the gain margin and the phase margin. As such, even in cases where the frequency characteristic of the actual machine varies due to the position of the load device, a stable high-speed and high-precision control can be enabled, which does not cause unusual sound or vibration. At the same time, because the data of the frequency characteristic of the actual machine can be formulated to the optimization problem without any processing, there is no effort for modeling, and a controller can be designed in consideration of all of the resonance characteristics.

In the present example configuration, a machine tool having a shaft for driving a table from a motor via a ball screw is exemplified. However, the technique of the present disclosure is also applicable to a shaft in which the load device is a spindle head, or to a machine tool driven by a linear motor, and is also applicable to industrial machines other than the machine tool. In addition, in the above description, the embodiment described above is described exemplifying a velocity control system, but the structure of the velocity control system is not important, and the technique is also applicable to a position control system, and a cascaded control system in which the position and velocity control systems are combined.

The invention claimed is:

1. A servo control apparatus which drives a load device by a servo motor, the servo control apparatus comprising:
   a command generator that generates a command value of the servo motor;
   a detector that detects a state quantity of the servo motor or the load device to be driven;
   a controller that controls a motor input signal such that the command value and an output of the detector coincide with each other;
   an actual machine frequency characteristic measurer that calculates a frequency characteristic of an actual machine from the motor input signal and the output of the detector; and
   a parameter adjuster that finds a solution for a parameter of the controller, which sets a difference, between an open loop characteristic, calculated from a calculation result of the actual machine frequency characteristic measurer and a frequency characteristic of the controller, and an ideal open loop characteristic, to be less than or equal to a predefined reference, or to be a minimum, and that applies the obtained parameter to the controller, wherein
   when the actual machine frequency characteristic measurer calculates the frequency characteristic of the actual machine, the actual machine frequency characteristic measurer changes a position of the load device to an arbitrary position and calculates a frequency characteristic of the actual machine for each position,
   parameters of the controller are a plurality of variables included in a formula that represents the controller,
   the ideal open loop characteristic is represented by a formula that includes a predefined coefficient and a Laplacian operator as elements, the formula being one formula determined based on a performance demanded by a designer for the controller,
   the parameter adjuster applies the controller to individual actual machine frequencies corresponding to multiple positions to calculate a plurality of open loop characteristics,
   the parameter adjuster obtains a combination of the plurality of variables such that the sum of differences between each of the plurality of open loop characteristics and the ideal open loop characteristic is less than or equal to a predefined reference value, or is a minimum, and
   the parameter adjuster applies the obtained variables to the controller as the parameters of the controller.

2. The servo control apparatus according to claim 1, wherein the controller is represented by formula (3):

$$C(j\omega) = \left(K_p + \frac{K_i}{j\omega}\right) \cdot \prod_{k=1}^{N} \left(\frac{(j\omega)^2 + 2\alpha_k \zeta_k \omega_k (j\omega) + \omega_k^2}{(j\omega)^2 + 2\zeta_k \omega_k (j\omega) + \omega_k^2}\right) \quad (3)$$

where $K_p$ and $K_i$ are parameters of a PI compensator, $\alpha_k$, $\zeta_k$, and $\omega_k$ are parameters of a notch filter, and s represents a Laplacian operator,
wherein open loop characteristics $L_1(j\omega)$, $L_2(j\omega)$, ..., $L_n(j\omega)$ in frequency characteristics of the actual machine are represented by formula (4):

$$\begin{bmatrix} L_1(j\omega) \\ L_2(j\omega) \\ \vdots \\ L_n(j\omega) \end{bmatrix} = \left(K_p + \frac{K_i}{j\omega}\right) \cdot \prod_{k=1}^{N} \left(\frac{(j\omega)^2 + 2\alpha_k \zeta_k \omega_k (j\omega) + \omega_k^2}{(j\omega)^2 + 2\zeta_k \omega_k (j\omega) + \omega_k^2}\right) \cdot \begin{bmatrix} P_1(j\omega) \\ P_2(j\omega) \\ \vdots \\ P_n(j\omega) \end{bmatrix} \quad (4)$$

where the frequency characteristics of the actual machine are $P_1(j\omega)$, $P_2(j\omega)$, ..., $P_n(j\omega)$,
wherein the parameter adjuster obtains $K_p$, $K_i$, $\alpha_k$, $\zeta_k$, and $\omega_k$ values that minimize a value represented by formula (5) and applies the obtained values to the controller:

$$\min_{K_p, K_i, \alpha_k, \zeta_k, \omega_k} \sum_{q=1}^{n} \sum_{t=1}^{T} |L_d(j\omega_t) - L_q(j\omega_t)| \quad (5)$$

wherein the ideal open loop characteristic $L_d(s)$ is represented by formula (6):

$$L_d(s) = \alpha \frac{s + \beta}{s^2} \quad (6)$$

where $\alpha$ and $\beta$ are arbitrary coefficients.

3. A servo control method for driving a load device by a servo motor, the method comprising:
   operating the servo motor according to a command value;
   detecting, with a detector, a state quantity of the servo motor or the load device to be driven;
   controlling, with a controller, a motor input signal so that the command value and an output of the detector coincide with each other;
   calculating a frequency characteristic of an actual machine from the motor input signal and the output of the detector; and
      finding a solution for a parameter of the controller, which sets a difference, between an open loop characteristic, calculated from the frequency characteristic of the actual machine and a frequency characteristic of the controller, and an ideal open loop characteristic, to be less than or equal to a predefined reference, or to be a minimum, and applying the obtained parameter to the controller, wherein
   the calculating a frequency characteristic of an actual machine comprises changing a position of the load device to an arbitrary position and calculating a frequency characteristic of the actual machine for each position,
   parameters of the controller are a plurality of variables included in a formula that represents the controller,
   the ideal open loop characteristic is represented by a formula that includes a predefined coefficient and a Laplacian operator as elements, the formula being one formula determined based on a performance demanded by a designer for the controller,
   the finding a solution comprises applying the controller to individual actual machine frequencies corresponding to multiple positions to calculate a plurality of open loop characteristics,
   the finding a solution comprises obtaining a combination of the plurality of variables such that the sum of differences between each of the plurality of open loop characteristics and the ideal open loop characteristic is less than or equal to a predefined reference value, or is a minimum, and the finding a solution comprises applying the obtained variables to the controller as the parameters of the controller.

* * * * *